United States Patent [19]

McKernan

[11] Patent Number: 4,486,264

[45] Date of Patent: Dec. 4, 1984

[54] DOOR FRAME ASSEMBLY MACHINE

[76] Inventor: Gary M. McKernan, 10/12 Opala St., Regency Park, South Australia 5010, Australia

[21] Appl. No.: 514,461

[22] Filed: Jul. 18, 1983

[30] Foreign Application Priority Data

Apr. 18, 1983 [AU] Australia ............................ PF8934

[51] Int. Cl.$^3$ ............................................ B23P 19/00

[52] U.S. Cl. .................................. 156/538; 156/197; 227/48

[58] Field of Search ................ 156/197, 538, 556–559; 428/73, 116–118; 227/40, 44–45, 48, 100; 144/2 A

[56] References Cited

U.S. PATENT DOCUMENTS

| | | | |
|---|---|---|---|
| 2,622,999 | 12/1952 | Faussner | 156/197 X |
| 2,893,076 | 7/1959 | Herts | 428/118 X |
| 3,227,601 | 1/1966 | Crosby | 428/116 X |
| 3,681,842 | 8/1972 | Blakeslee | 227/48 X |

*Primary Examiner*—David Simmons

[57] ABSTRACT

A method of assembly of a pair of stiles to a core sub-assembly which comprises a pair of rails and an expandable lattice spacer panel interconnecting the rails, which comprises clamping the end rails of the core sub-assembly and separating them from one another so as to expand the lattice spacer core, retaining the end rails in position while positioning stiles with respect to them, joining the stiles at the corners of the end rails, spot-joining the lattice to the stiles, and ejecting the door frames so formed from the machine.

10 Claims, 11 Drawing Figures

DOOR FRAME ASSEMBLY MACHINE

This invention relates to a machine which is capable of assembling the inner frame of a door, and to a method of effecting said assembly.

BACKGROUND OF THE INVENTION

In the construction of wooden doors, for example for domestic use, it is standard procedure to have a core sub-assembly comprising the upper and lower rails of an inner frame interconnected by an expandable lattice spacer panel of cardboard, to subsequently attach the stiles to the rails and the cardboard lattice to the stiles, and then to put the two outer panels one on each side of the door. One of the time-consuming jobs which is encountered is the opening of the two rails away from one another so as to expand the cardboard core, and the attachment thereof to the stiles. The main object of this invention is to provide a machine which will achieve these results inexpensively and at higher production rates.

BRIEF SUMMARY OF THE INVENTION

In this invention a machine is provided with a table having clamps thereon which engage the rails of a core sub-assembly and means to separate them so as to expand the cardboard lattice, a pair of spaced stiles parallel to one another, means to locate the stiles with respect to the rails and secure them at the corners of the door frame, and also to secure the cardboard to the stiles.

In another aspect the invention comprises a method of assembly of a pair of stiles to a core sub-assembly which comprises a pair of rails and an expandable lattice spacer panel interconnecting the rails, which comprises clamping the end rails of the core sub-assembly and separating them from one another so as to expand the lattice spacer core, retaining the end rails in position while positioning stiles with respect to them, joining the stiles at the corners of the end rails, spot-joining the lattice to the stiles, and ejecting the door frames so formed from the machine.

BRIEF DESCRIPTION OF THE PREFERRED EMBODIMENT

Figure 1:
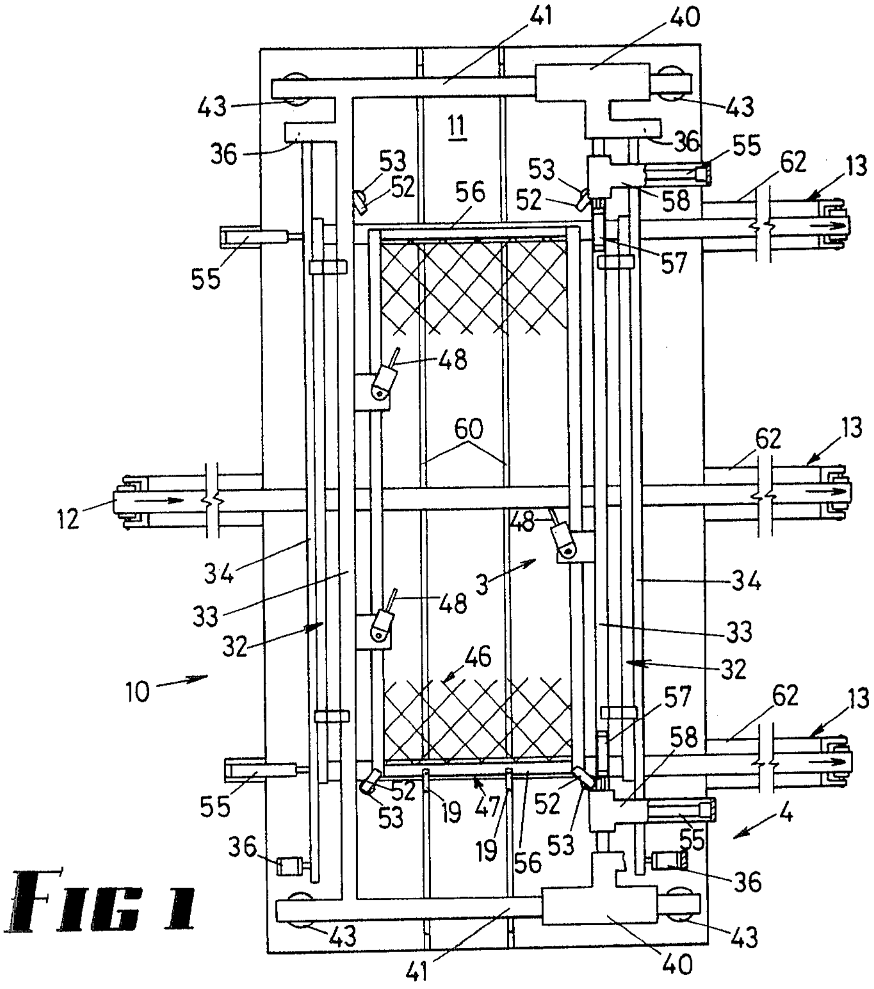
Figure 2:
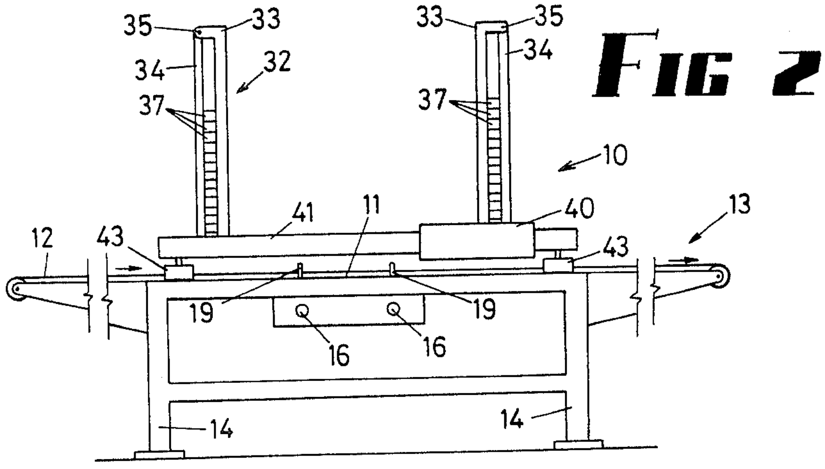
Figure 3:
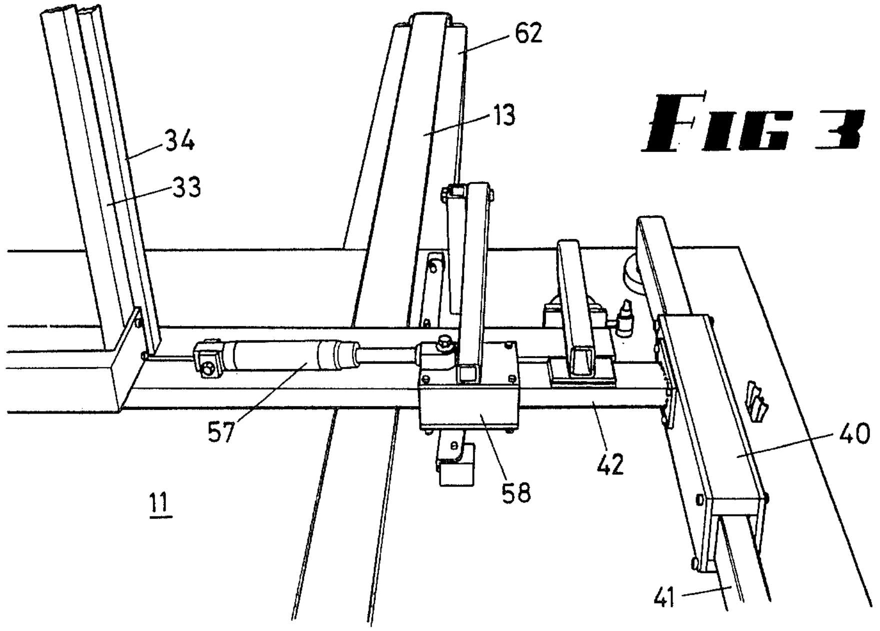
Figure 4:
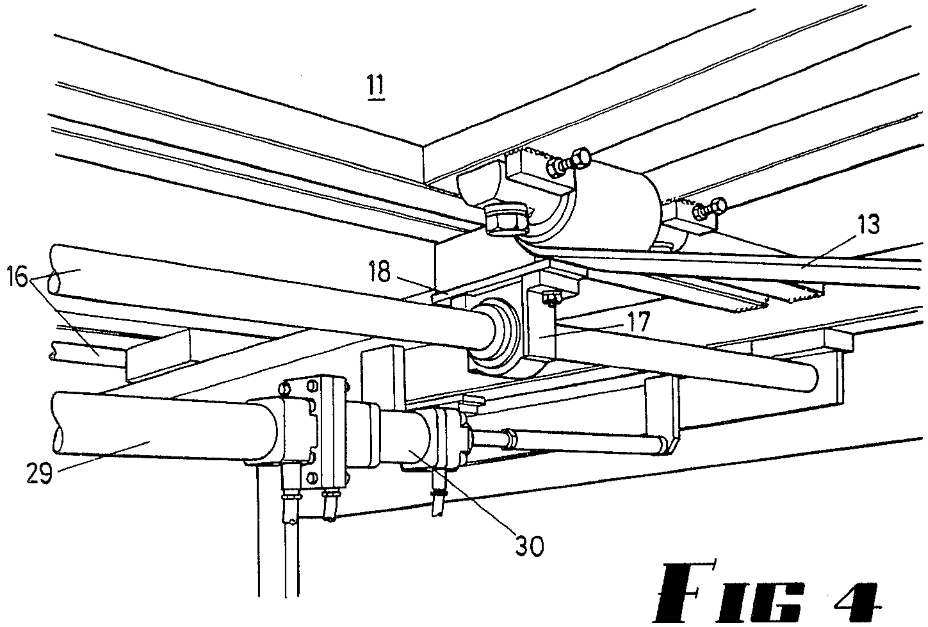
Figure 5:
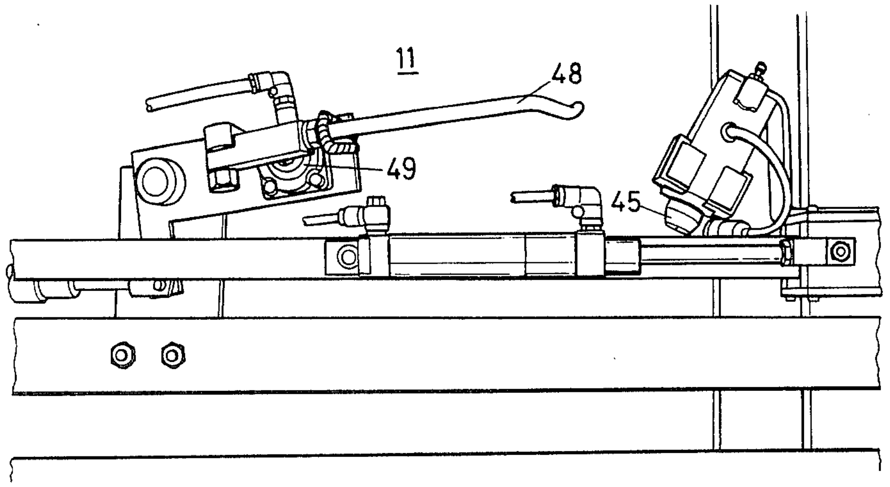
Figure 6:
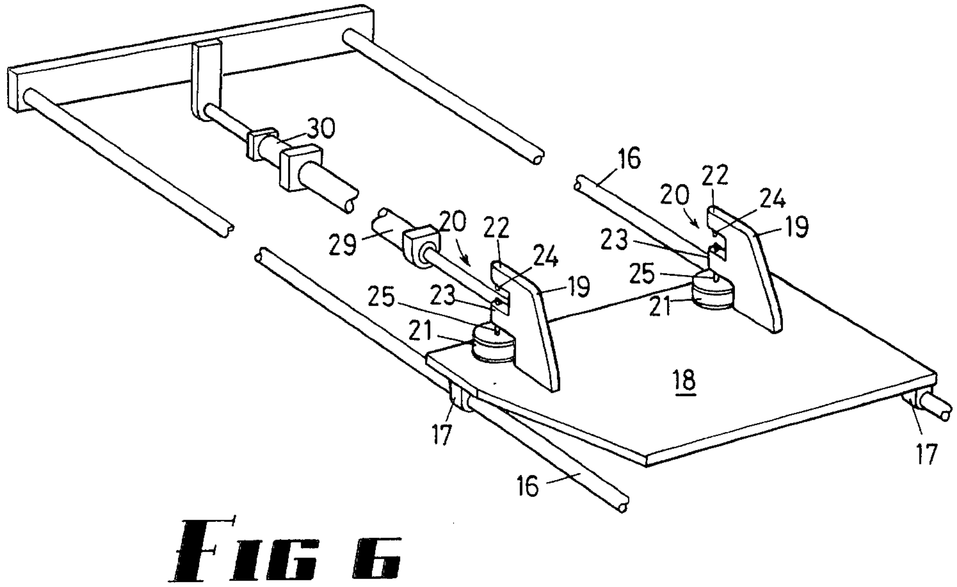
Figure 7:
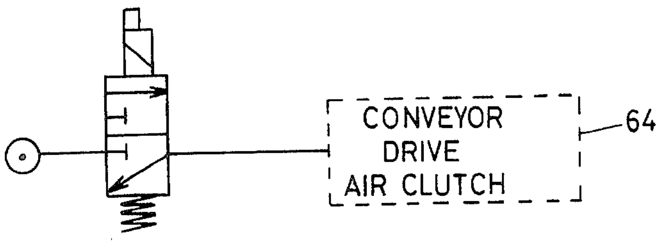
Figure 8:
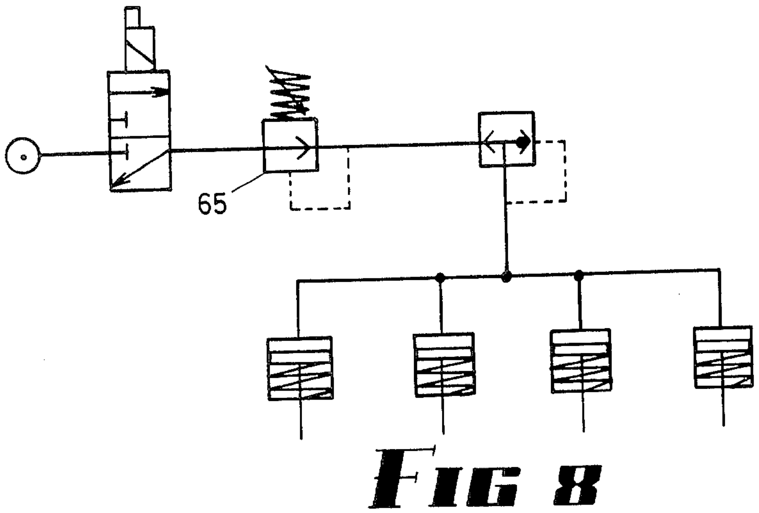
Figure 9:
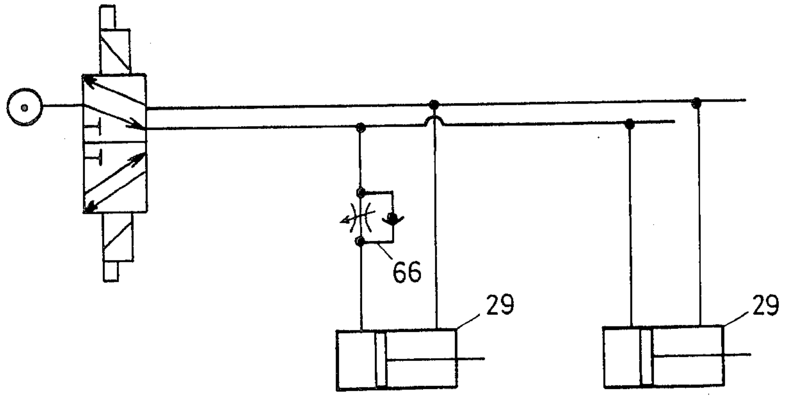
Figure 10:
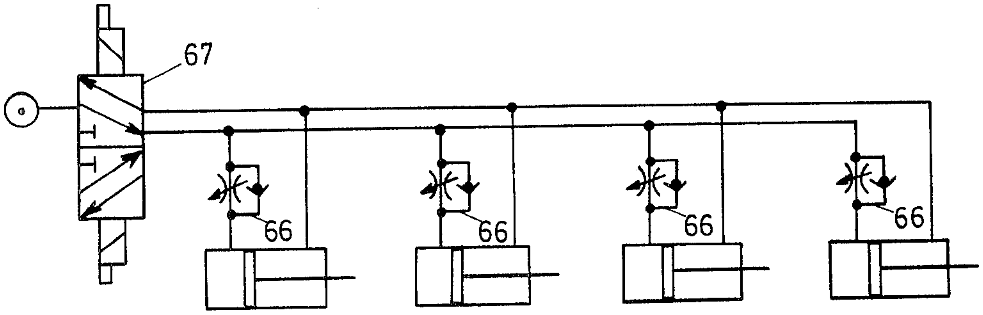
Figure 11:
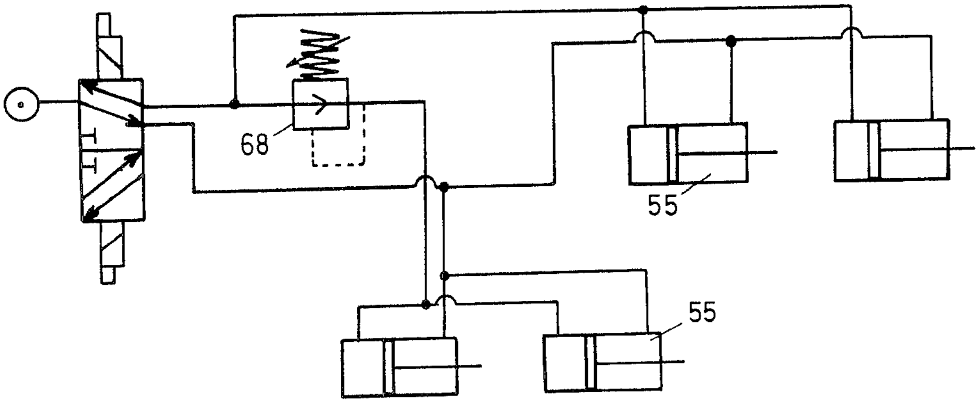

An embodiment of the invention is described hereunder in some detail with reference to, and is illustrated in, the accompanying drawings, in which FIG. 1 is a plan view of a door frame assembly machine, FIG. 2 is an end elevation of the machine, FIG. 3 is a fragmentary top perspective view of portion of the machine (but not showing a stapling gun), FIG. 4 is a perspective underside view of portion of the machine, FIG. 5 is a perspective top view of a glue applicator and a pressure finger, FIG. 6 is a perspective view of one of the rail clamp arrangements, FIG. 7 is the pneumatic diagram of a conveyor drive air clutch, FIG. 8 is the pneumatic diagram each of:

(a) rail clamp cylinders, (b) finger lift cylinders, (c) magazine clamp cylinders, and (d) magazine lift cylinders, FIG. 9 is the pneumatic diagram of primary stretch cylinders, FIG. 10 is the pneumatic diagram of each of:

(a) secondary stretch and stile push retraction cylinders, (b) staple gun lift cylinders, and (c) glue applicator, and FIG. 11 is the pneumatic diagram of the stile push cylinders.

In this embodiment a machine 10 is provided with a flat table 11, an input conveyor 12 on one side of the table and an output conveyor 13 on the other side of the table.

The table is supported by legs 15 at its corners, and beneath the table there is provided a pair of bar guides 16 parallel to one another and extending longitudinally. Each bar guide is engaged by slide type linear bearings 17 (which can be of recirculating ball type) on a pair of plates 18 (of which one only is shown), and each plate has upstanding from it a pair of clamp frames 19.

Each clamp frame 19 comprises an upstanding plate which has a recess 20 at its lower end containing a small clamp cylinder 21, and upper and lower arms 22 and 23 forming a yoke. The upper yoke arm of each clamp has a threaded member 24 which is adjustable for position and the lower yoke arm contains an aperture through which a clamping pin 25 is slidable, the clamping pin being movable under the influence of its respective clamp cylinder 21. The space beneath the clamping pin when withdrawn and the adjustment stop in the upper yoke arm exceeds the thickness of an upper or lower rail.

Each clamp plate 18 is coupled to the frame of the machine by means of two cylinders mounted back to back. The primary stretch cylinder 29 is a relatively long cylinder and is capable of moving the clamp plate approximately half the length of the table, while the secondary stretch cylinder 30 is a short cylinder and is useful for achieving an additional movement for final engagement of the rails before clamping.

Along one side (the input side) of the machine, there is a magazine assembly 32 comprising a fixed magazine frame 33 and a moving frame 34, each having upstanding arms which are pivoted about pivot pins 35 at their upper ends. The moving frame 34 is thus pivoted for transverse clamping movement with respect to the fixed frame, such movement being effected by a pair of small magazine clamp cylinders 36 one at each end of the machine. The frames are so spaced that they constitute stack means for the stacking of a plurality of stiles 37 one above the other.

On the outfeed side of the machine there is a similar magazine assembly 32 having a similar frame arrangement for the stacking of stiles, but that frame arrangement is carried on adjustable sleeves 40 at its ends which are movable across respective end rails 41 to provide adjustment for different width doors which may need to be fabricated by the machine. The magazine clamp cylinders 36 operate between a sleeve on a fixed rail 42 carried by sleeves 40, and the moving rail 34 of the magazine frame. The end rails 41, and with them, the magazine assemblies 32, are carried by four magazine lift cylinders 43 at the corners of the table 11.

As shown only in FIG. 5, in order to provide means for securing the cardboard core to the inner wall of the stile, there are provided three spray jets 45, two on one side, and one on the other, and these are arranged to spray a small quantity of hot melt glue to the respective stiles 37 before the cardboard lattice 46 of a core sub-assembly 47 is pushed into position by means of fingers 48 on respective rocking arms carried on the frame and rocked by means of respective finger lift cylinders 49. The fingers move downwardly and outwardly and thus urge the cardboard into contact with the glue on the stiles so as to secure the cardboard to the stiles.

At each corner of the machine there is provided an automatic stapling gun 52 which is effective in joining the ends of the stiles to the ends of the rails at the corners of the door frame assembly, before the door frame assembly is moved out onto the outfeed conveyor. Each of these is retractable by a respective staple gun lift cylinder 53.

There are provided four stile push cylinders 55, two on each side of the machine. Each pair functions to push the lowermost stile 37 from its magazine assembly into contact with the ends of the rails 56 of the core sub-assembly 47. However, outfeed conveyor 13 will eject the assembled door frame from the machine, and therefore the push cylinders 55 on the outfeed side of the machine must be retracted. This is effected by the stile push retraction cylinders 57 which slide the push cylinders along rail 42 (on the outfeed side only). Cylinders 49 and 53 also retract fingers 48 and gun 52 for this reason.

The sequence of operations is as follows:

A core and rail sub-assembly 47 is placed on the infeed conveyor 12 and is moved by the infeed conveyor across the machine at the longitudinal centre thereof, coming to a stop against a side stop (not shown) on the machine.

The primary longitudinal stretch cylinders 29 have by this time moved the clamp frames 19 almost to the clamping position, and once the sub-assembly is in position the secondary stretch cylinders 30 move the clamp yokes over the rails 56, and the small clamping cylinders 21 on the yokes clamp the rails. The primary stretch cylinder then retracts to withdraw the rails back to stops (not shown) on the table. The movement of the clamp frames is through longitudinal slots 60 in the table 11.

The stack of stiles 37 on each side is then dropped by release of magazine clamp cylinders 36 at the bottom of the magazine assemblies 32 and the stiles are pushed into position against the ends of the rails by means of stile push cylinders 55 on the frame. The rail clamping cylinders 21 are then released and the secondary stretch cylinders 30 operate to move clear of the assembled frame.

Staple guns 52 are automatically energised and lowered onto the joints at the corners of the door frame and are stapled to the corners. Spray jets 45 apply localised areas of glue to the stiles, and the pressure fingers 48 are rocked and the fingers push the cardboard core lattice 46 across the stiles to adhere the cardboard to the stiles 37.

The stiles push cylinders 55 then retract and are cleared out of the way on the outfeed side. This retraction is achieved by means of retraction cylinders 57 which slide the push cylinders 55 (on their slides 58) along the fixed rail 42.

The conveyor belts 13 on the outfeed side then take the so-formed assembly onto three arms 62 on the outfeed side from where they are unloaded, and the cycle is repeated.

In the above action, the magazine frames 34 clamp the next to bottom stiles, and the whole assembly is lifted by the small magazine lift cylinders 43 under the ends of the end rails 41. The entire magazine assemblies, moving and fixed rails are elevated during this action, providing ample clearance both for infeed and outfeed of the rail/core sub-assembly and the finished door frame.

The overall length of the door frame made by the machine according to this invention slightly exceeds the overall length of the door to be finally produced, and there is a subsequent trimming operation at the ends but this is in accordance with known art.

FIG. 7 shows the pneumatic control of a conveyor drive air clutch 64 (not shown physically on FIGS. 1 to 6).

FIG. 8 shows the pneumatic control diagram of the four air cylinders in each of four situations, that is the rail clamp cylinders 21, the finger lift cylinders 49, the magazine clamp cylinders 36 and the magazine lift cylinders 43, all of which are spring return type cylinders. It might be noted that regulating valve 65 is required only with respect to the rail clamp cylinders 21, and it is unnecessary to use any regulating valve for the other three functions.

FIG. 9 shows the pneumatic diagram of the primary stretch cylinders 29. Valve 66 is a one way flow control valve.

FIG. 10 shows the pneumatic control diagram of the four cylinders in each of the three situations, that is the secondary stretch cylinders 30 and stile push retraction cylinders 57 both operated by the one control valve 67, secondly the staple gun lift cylinders 53, and thirdly the glue applicator cylinders (not shown in 1 to 6).

FIG. 11 shows the pneumatic control diagram for the stile push cylinders 55 (on both infeed and outfeed sides), the speeds of which are controlled by pressure regulator valve 68 in their operative stroke.

I claim:

1. A door frame assembly machine for assembly of a pair of stiles to a core sub-assembly which comprises a pair of end rails and an expandable lattice spacer core interconnecting the rails, comprising a table, clamps on the table engageable with said rails, and clamp separating means comprising separating cylinders coupled to said clamps and operable to separate said clamps (and thereby the rails), a pair of spaced parallel stiles, means to locate the stiles with respect to the rails, and securing means on the table for securing the stile ends to the rail ends to thereby form a rectilinear frame, and further securing means for securing the sides of the lattice spacer panel to the stiles.

2. A door frame assembly machine according to claim 1, wherein said separating cylinders comprise a pair of primary stretch cylinders, and further comprising a pair of secondary stretch cylinders mounted back to back with respective said primary stretch cylinders.

3. A door frame assembly machine according to claim 2 wherein each of said rail engaging clamps comprises a clamp plate extending above the table and having a recess therein, a clamp cylinder, and a clamp pin operatively coupled to the clamp cylinder to clamp a rail in said recess upon actuation of said cylinder, there being two said clamp plates on each of a pair of plates, each said plate being operatively coupled to a primary and secondary clamp cylinder combination, a pair of bar guides extending along the machine beneath the said table, and linear bearings on each said plate engaging the bar guides and guiding said plate for longitudinal movement.

4. A door frame assembly machine according to claim 1 further comprising a pair of magazine assemblies extending longitudinally and on respective sides of the machine, each magazine assembly comprising an upstanding fixed magazine frame, pivot pins on the fixed magazine frame, moving magazine frame members depending from the pivot pins to be pivoted for movement with respect to the fixed frame, and a magazine clamp cylinder operatively coupled to lower ends of the moving and fixed frames arranged to effect said pivotal movement, for firmly engaging the next to bottom stile of a series of stiles when stacked in the magazine assemblies.

5. A door frame assembly machine according to claim 4 wherein the fixed frame of the magazine assembly on the outfeed side of the machine comprises stile push cylinders, slides movable along the fixed frame in a longitudinal direction, and stile push retraction cylinders between the fixed frame and the slides, said stile push cylinders being operable to push the lowermost of a plurality of stiles when in the outfeed side magazine assembly transversely inwardly to engage the respective ends of the rails of a core sub-assembly when on the table, and said stile push retraction cylinders being operable to move the stile push cylinder out of the path of travel of a door frame when moved transversely from the table in an outfeed direction.

6. A door frame assembly machine according to claim 1, further comprising an infeed conveyor on the infeed side of the machine and an outfeed conveyor on the outfeed side of the machine, each said conveyor comprising at least one conveyor belt.

7. A door frame assembly machine according to claim 4 wherein said stiles are positioned with respect to the end rails by firstly locating the stiles in respective magazines on the sides of the machine, and pushing the lowermost stile from each magazine into contact with the ends of the rails, and securing the stile to the rail ends when in such contact.

8. A door frame assembly machine according to claim 7 comprising retracting the stile push cylinder from the path of travel of the door frame after assembly, and conveying the assembled door frame transversely of the machine and beneath one of the stile magazines.

9. A door frame assembly machine according to claim 4 further comprising applying glue to areas of the stiles and pushing the lattice spacer core into contact with said glue to adhere the stiles to the core.

10. A door frame assembly machine according to claim 4 further comprising stapling the stile ends to the rail ends with staple guns and retracting these staple guns.

* * * * *